(12) United States Patent
Wallace et al.

(10) Patent No.: US 10,789,965 B2
(45) Date of Patent: Sep. 29, 2020

(54) SYSTEM, APPARATUS AND METHOD FOR TIME SYNCHRONIZATION OF DELAYED DATA STREAMS BY MATCHING OF WAVELET COEFFICIENTS

(71) Applicant: Silicon Laboratories Inc., Austin, TX (US)

(72) Inventors: Bradley Arthur Wallace, Austin, TX (US); Carl Harry Alelyunas, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 156 days.

(21) Appl. No.: 16/026,131

(22) Filed: Jul. 3, 2018

(65) Prior Publication Data

US 2020/0013420 A1 Jan. 9, 2020

(51) Int. Cl.
*G10L 19/02* (2013.01)
*G06F 17/14* (2006.01)
*G06K 9/00* (2006.01)

(52) U.S. Cl.
CPC ........ *G10L 19/0216* (2013.01); *G06F 17/148* (2013.01); *G06K 9/0053* (2013.01)

(58) Field of Classification Search
CPC ..................................................... G10L 25/87
USPC ........................................................ 704/267
See application file for complete search history.

(56) References Cited

U.S. PATENT DOCUMENTS

| 8,050,446 B2* | 11/2011 | Kountchev | G06T 1/0028 375/E7.018 |
|---|---|---|---|
| 8,976,969 B2 | 3/2015 | Elenes et al. | |
| 2007/0100609 A1* | 5/2007 | Kim | G10L 25/87 704/211 |
| 2013/0013138 A1* | 1/2013 | Lu | B60L 3/0061 701/22 |
| 2016/0088160 A1* | 3/2016 | Tan | G10L 25/78 455/416 |

OTHER PUBLICATIONS

George Tzanetakis, et al., "Audio Analysis using the Discrete Wavelet Transform," 2001, 6 pages.

* cited by examiner

*Primary Examiner* — Huyen X Vo
*Assistant Examiner* — Timothy Nguyen
(74) *Attorney, Agent, or Firm* — Trop, Pruner & Hu, P.C.

(57) ABSTRACT

In one example, an apparatus includes: a wavelet transform engine to receive a first signal stream and perform a wavelet transform on a first time domain sample of the first signal stream, the first wavelet transform engine to output at least one first coefficient for a first frequency range; an energy calculation circuit to compute a first energy signature for the at least one first coefficient; and a correlation circuit to generate a correlation value using the first energy signature, a second energy signature and a plurality of previous energy signatures.

20 Claims, 9 Drawing Sheets

SYSTEM, APPARATUS AND METHOD FOR TIME SYNCHRONIZATION OF DELAYED DATA STREAMS BY MATCHING OF WAVELET COEFFICIENTS

BACKGROUND

In a broadcast radio receiver, it is sometimes desirable to receive multiple audio streams of the same content and switch from one stream to the other stream seamlessly. However, the streams may be delayed in time with respect to one another. As such, some technique is needed to reliably determine the unknown delay time.

Some systems use a cross-correlation metric. However, the correlation of real-time audio streams delayed by potentially large time intervals requires large amounts of processing power and storage when performed at full sample rate. Available tradeoffs between correlating fewer samples and still maintaining a high confidence in the value of the delay estimation within an acceptable estimation error do not adequately address this situation.

SUMMARY OF INVENTION

In one aspect, an apparatus includes: a first wavelet transform engine to receive a first signal stream and perform a wavelet transform on a first time domain sample of the first signal stream, the first wavelet transform engine to output at least one first coefficient for a first frequency range; a first energy calculation circuit to compute a first energy signature for the at least one first coefficient; a first filter to filter the first energy signature; a first normalization circuit to generate a first normalized value based on the first energy signature and the filtered first energy signature; and a correlation circuit to generate a correlation value using the first normalized value, a second normalized value and a plurality of previous first normalized values and second normalized values.

In an example, the correlation circuit is to store the correlation value in a correlation storage. The apparatus may further include a peak search circuit to identify a peak value of a plurality of correlation values stored in the correlation storage. The peak search circuit may identify a second peak value of the plurality of correlation values stored in the correlation storage, the second peak value less than the first peak value. The peak search circuit may calculate a first ratio based on the peak value and the second peak value. The peak search circuit may calculate a second ratio based on the peak value and an average of the plurality of correlation values in the correlation storage. The peak search circuit may generate a reliability metric based on the first ratio and the second ratio. The peak search circuit may identify a correlation between the first signal stream and the second signal stream in response to the reliability metric being greater than a first threshold. The peak search circuit may identify the correlation in response to the reliability metric being less than the first threshold and greater than a second threshold for at least a first plurality of consecutive windows.

In an example, the wavelet transform engine includes: a first filter chain including a first plurality of delay elements and a first plurality of downsamplers, the first filter chain to generate a plurality of first coefficients including the at least one first coefficient; and a second filter chain including a second plurality of delay elements and a second plurality of downsamplers, the second filter chain to generate a plurality of second coefficients including the at least one second coefficient.

In another aspect, a method includes: receiving, in a processor, a first demodulated signal and a second demodulated signal, the first demodulated signal obtained from a first demodulator, the second demodulated signal obtained from a second demodulator; performing, in the processor, a wavelet transform on first time domain samples of the first demodulated signal and second time domain samples of the second demodulated signal; outputting a first detail coefficient for a selected frequency range based on the wavelet transform of the first time domain samples and outputting a second detail coefficient for the selected frequency range based on the wavelet transform of the second time domain samples; computing a first energy signature based on the first detail coefficient and computing a second energy signature based on the second detail coefficient; and performing a cross-correlation on a plurality of first energy signatures and a plurality of second energy signatures stored in at least one buffer to identify common content in the first demodulated signal and the second demodulated signal, the first energy signature one of the first plurality of first energy signatures and the second energy signature one of the plurality of second energy signatures.

In an example, the method further comprises: filtering the first energy signature into a filtered first energy signature and normalizing the first energy signature based on the filtered first energy signature; filtering the second energy signature into a filtered second energy signature and normalizing the second energy signature based on the filtered second energy signature; and storing the normalized first energy signature and storing the normalized second energy signature in the at least one buffer.

In an example, the method further comprises: determining whether there are a sufficient number of first energy signatures and second energy signatures stored in the at least one buffer; and in response to the determination, performing the cross-correlation on the plurality of first energy signatures and the plurality of second energy signatures. The method may further include: identifying a peak value based on the cross-correlation; identifying a second peak value based on the cross-correlation, where the second peak value is less than the peak value; and calculating an average cross-correlation value based on a plurality of cross-correlation values. The method may further include: determining a first ratio based on the peak value and the second peak value; and determining a second ratio based on the peak value and the average cross-correlation value.

In an example, the method further comprises determining a reliability metric using the first ratio and the second ratio. The method may also output a delay estimate based on the peak value and output the reliability metric when the reliability metric exceeds a first threshold. This reliability metric may be output when it exceeds a second threshold less than the first threshold for at least a predetermined plurality of consecutive windows.

In another aspect, a system includes: a first antenna to receive a first RF signal; a second antenna to receive a second RF signal; a first tuner coupled to the first antenna to receive and process the first RF signal to output a first downconverted modulated signal; a second tuner coupled to the second antenna to receive and process the second RF signal to output a second downconverted modulated signal; a first demodulator coupled to the first tuner to demodulate the first downconverted modulated signal to output a first signal stream; a second demodulator coupled to the second tuner to demodulate the second downconverted modulated signal to output a second signal stream; and a linker circuit to seamlessly link the first signal stream and the second signal stream to output a seamlessly linked signal stream to a processor.

In one example, the linker circuit includes: a wavelet transform engine to receive the first and second signal streams, perform a wavelet transform on a first time domain sample of the first signal stream and a second time domain sample of the second signal stream, and output at least one first coefficient and at least one second coefficient for a first frequency range; an energy calculation circuit to compute a first energy signature for the at least one first coefficient and a second energy signature for the at least one second coefficient; and a correlation circuit to generate a correlation value using the first energy signature, the second energy signature, and a plurality of stored first and second energy signatures.

In an example the linker circuit is to: identify a peak value of a plurality of correlation values; identify a second peak value of the plurality of correlation values; determine a first ratio based on the peak value and the second peak value; determine a second ratio based on the peak value and an average correlation value; determine a delay estimate based at least in part on the peak value; determine at least one reliability metric based on the first and second ratios; and seamlessly link the first signal stream and the second signal stream based at least in part on the delay estimate and the at least one reliability metric.

DETAILED DESCRIPTION

Figure 1:
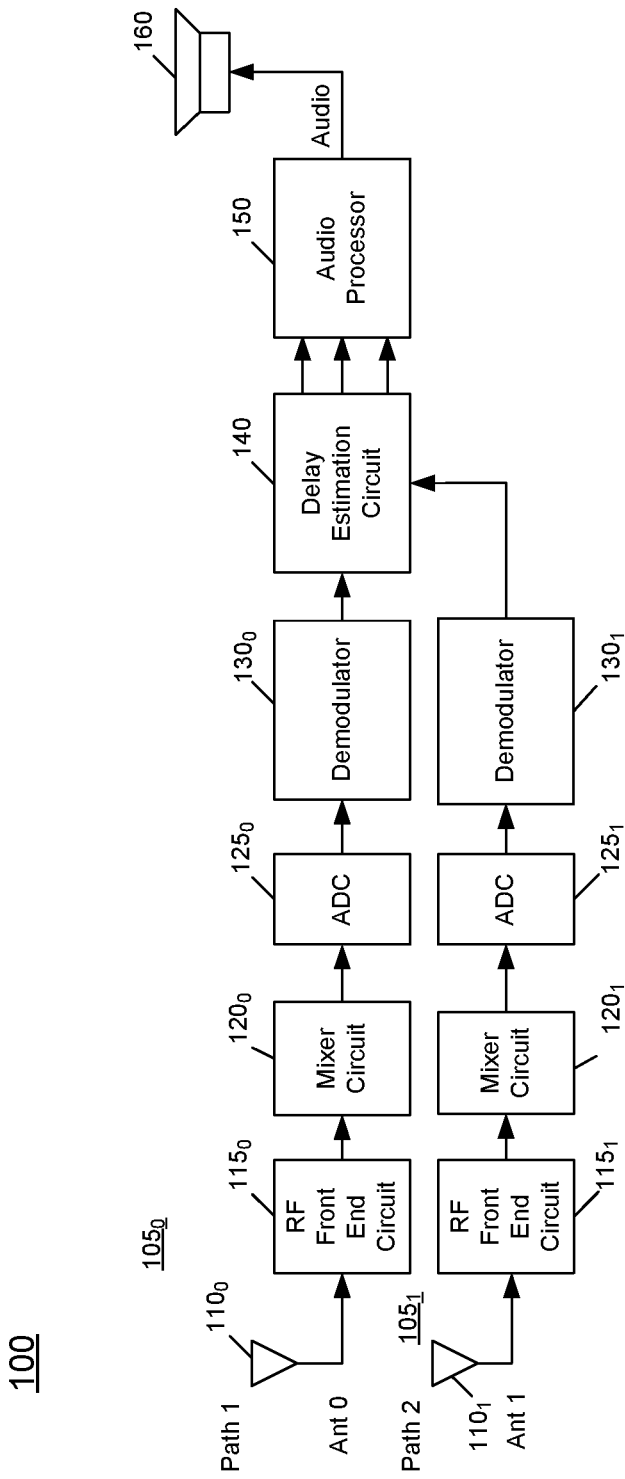
FIG. 1 is a block diagram of a receiver in accordance with an embodiment.

In various embodiments, circuits and techniques are provided to process multiple data streams in parallel and identify matching content in the data streams. Although embodiments are described herein with regard to detection and synchronization of common audio content received via two different radio frequency (RF) channels, understand embodiments are not limited in this regard. That is, embodiments are applicable to any system in which detection and synchronization of common content in multiple data streams may occur, such as video streams or other generic data streams.

In embodiments herein, a time synchronization of content included in multiple audio streams may be effected using wavelet transforms to represent signals of the different audio streams, to enable an identification of common content to identify a synchronization point between the two or more signal streams. In embodiments a wavelet transform may be used to represent a signal and correlate wavelet signatures in chosen sub-bands, to obtain highly reliable delay estimations. In one particular embodiment, a Haar wavelet transform may be used to realize computation efficiency such that embodiments can reduce computational requirements, memory, and improve reliability of resulting estimates.

For purposes of discussion, assume the two audio streams are demodulated signal streams received from different processing paths, e.g., of multiple tuners that receive RF content at different frequencies. In various implementations, the common content can be transmitted at different frequencies using the same or different modulation schemes. For example, a radio station may output its programming via an analog radio modulation scheme such as FM and additionally via a digital modulation scheme such as an audio channel or another digital modulation scheme. Furthermore, in some radio standards, e.g., digital audio broadcasting (DAB), radio stations may output programming from multiple transmitters operating at different frequencies using the same modulation scheme. In this way, as a vehicle or other mobile user traverses along a route, as signal quality degrades from a first signal received from a first transmitter, a fading or blending operation may occur to move operation to a second signal that is received from a second transmitter via which the same program is broadcast.

A continuous wavelet transform (CWT) is as follows:

$$\gamma=(s,\tau)=\int f(t)\psi^*_{s,\tau}(t)dt \qquad (EQ. 1),$$

where s is the scale and $\tau$ is the translation. The inverse wavelet transform is:

$$f(t)=\iint \gamma(s,t)\psi_{s,\tau}(t)d\tau ds \qquad (EQ. 2).$$

These wavelets are derived from a single basic wavelet function:

$$\psi_{s,\tau}(t) = \frac{1}{\sqrt{s}}\psi\left(\frac{t-\tau}{s}\right). \qquad (EQ. 3)$$

A discrete wavelet is below at Equation 4. In an example embodiment, the variables may be selected as $S_0=2$ and $\tau_0=1$ to make a binary dilation and translation.

$$\psi_{j,k}(t) = \frac{1}{\sqrt{s_0^j}}\psi\left(\frac{t-k\tau_0 s_0^j}{s_0^j}\right). \qquad (EQ. 4)$$

The mother wavelet is chosen such that different translations and dilations are orthonormal to each other:

$$\int \psi_{j,k}(t)\psi^*_{m,n}(t)dt=\{1 \text{ if } j=m \text{ and } k=, \text{ and } 0 \text{ otherwise}. \qquad (EQ. 5).$$

Then an arbitrary signal can be reconstructed from the discrete wavelet transform (DWT) coefficients:

$$f(t) = \sum_{j,k} \gamma(j,k)\psi_{j,k}(t). \qquad (EQ. 6)$$

There are many choices of mother wavelet functions. As described a Haar wavelet may be used, and its mother wavelet function is:

$\psi(t)=\{1$ where $0<t<\frac{1}{2}$, $-1$ where $\frac{1}{2} \leq t<1$, and otherwise $0$. (EQ. 7).

In turn the scaling function for this translation is:

$$\varphi(t)=\{1 \text{ where } 0 \le t < 1, \text{ and } 0 \text{ otherwise.} \qquad \text{(EQ. 8)}.$$

A Fourier transform can be considered a special case of the wavelet transform with a mother wavelet of: $e^{-j2\pi t}$. However this basis function oscillates forever, so it is impossible to ascertain time information from the Fourier domain.

Embodiments may be used to optimize the probability of true positives and false positives in the presence of large delay offsets, noise on the signals, and a finite time correlation window. In an embodiment the cross-correlation may be performed according to:

$$R_{x,y}(n) = \Sigma_k x(k) y^*(n+k) \qquad \text{(EQ. 9)}$$

where n is the lag and k is in the range ∞ to −∞ (for available compute and storage resources). The summation is computed over finite time periods based on the storage capacity availability and CPU time availability, which in an example implementation may be roughly 10 seconds.

A peak search then finds the peak of the correlation result and qualifies it based on its relation to other figures of merit in the correlation result. In turn, a delay estimate and reliability or confidence metric is provided to the user. One or more decision thresholds can be established such that the probability of a correct delay estimate is maximized for a confidence exceeding such one or more thresholds, and the probability that the threshold(s) are met for an incorrect delay estimate is minimized.

Embodiments use a wavelet transform to localize signals in both time and frequency domains, and then correlate to find matching coefficient energy signatures in a chosen sub-band. This wavelet transform enables large temporal widths for lower frequencies while maintaining short temporal widths for higher frequencies via the scaling properties of the wavelet transform. As an example, 2 time-domain samples can be used to analyze the frequency range [Fs/4, Fs/2], and 4 time-domain samples are used to analyze the frequency range [Fs/8, Fs/4], etc. In contrast, with other transforms such as a Fourier transform a large temporal width is needed to obtain fine frequency resolution, regardless of the range of frequencies of interest. A transform basis function, i.e., a wavelet transform, may be scaled, and can use shorter temporal windows as the frequency range of interest increases. Higher frequencies are represented with more coarse resolution (shorter time window), while lower frequencies are represented with more fine resolution (larger time window).

In contrast to embodiments herein, a simple time domain approach to signal transformation decimates (low-pass filters then downsamples) signals before correlation. Depending on the decimation ratio, too much relevant information is lost in such techniques, and a correlation peak becomes unreliable for delay determination. For example, if the original sample rate of the signal is Fs, then ideal decimation by a factor M will leave a baseband signal with Fs/(2M) as the highest frequency component in the signal. As M gets large, the richness of normal audio content in the [0, Fs/(2M)] region becomes less. Further, for these lower frequencies, the periods of the sine wave components (i.e., Fourier series) become larger, thus one would like a larger time window to see more complete periods, which may undesirably delay processing.

Another alternative approach is to use a short time Fourier Transform (STFT) to take a snapshot in time of M samples, compute the Fourier transform, then pick coefficients in the band of interest to represent the signal in the cross-correlations. In this alternative technique, the time window (boxcar) is multiplied with the discrete time signal, or in the frequency domain a sinc is convolved with the frequency domain signal. This operation leads to a smearing of frequencies and loss of resolution. The smaller the time window, the wider the sine, and the less individual frequencies are resolvable. Larger time windows will give narrower sine's and better frequency resolution but less time resolution, i.e., the fixed size window is large. As such these other techniques can lead to higher power consumption and compute costs as compared to the techniques described herein.

Referring now to FIG. 1, shown is a block diagram of a receiver in accordance with an embodiment. As illustrated in FIG. 1, receiver 100 is a multi-tuner receiver. As one example, receiver 100 may be a radio receiver incorporated into a vehicle, such that incoming radio frequency (RF) signals may be received by way of multiple antennas $110_0$, $110_1$ and processed in independent processing paths $105_0$, $105_1$. After suitable processing, one or more of the resulting processed signals may be output as an audio signal. As described herein, with the ability to receive the same content via these different processing paths, receiver 100 may identify the common content, e.g., according to a correlation technique, determine a delay estimate between the two audio streams, and provide this information, along with reliability metric information to enable appropriate blending or seamless handover from one audio stream to the other.

For ease of discussion, components within first signal processing path $105_0$ are discussed. Understand that the same components are present in second signal processing path $105_1$. And thus, reference numerals (without subscript) are intended to refer to generic components suitable for the various signal paths. As illustrated, incoming RF signals are received via an antenna $110_0$. The received RF signals are provided to an analog RF front end circuit $115_0$. Various signal processing of these RF signals may occur in RF front end circuit 115. As an example, such processing may include gain control, such as by way of a low noise amplifier (LNA). In some cases, front end circuit 115 may further include a filter. The processed signals are provided to a mixer circuit $120_0$. Mixer circuit $120_0$ may downconvert the received signal from RF to a lower frequency. In one embodiment, mixer $120_0$ may downconvert the RF signal to a zero intermediate frequency (ZIF) level. Of course, downconversion to other frequencies is possible. Understand that additional processing may be performed within mixer circuit $120_0$. Thereafter the downconverted signal is provided, to an analog-to-digital converter $125_0$, which digitizes the incoming lower frequency analog signal into digital form. The resulting digitized signal is provided to a demodulator $130_0$ which demodulates the digitized signal according to a given demodulation scheme, which may be an analog or digital-based demodulation to result in a demodulated signal that is provided to a delay estimation circuit 140.

As further illustrated in FIG. 1, similar processing in processing path $105_1$ yields an additional demodulated signal, also provided to delay estimation circuit 140. Using the techniques described herein, delay estimation circuit 140 may identify common content in the two audio streams, determine a synchronization point, e.g., corresponding to a delay estimate, to identify the time duration of a delay between the two audio streams, along with metrics.

As such, delay estimation circuit 140 may output the two analog streams, along with a delay estimate and reliability metric information to an audio processor 150. In turn, audio processor 150 may perform various audio processing on one or more of these streams and may in some instances perform a blending operation and/or a handover operation so that the audio signal output from audio processor 150 can transition from one audio stream to the other in a seamless manner. As illustrated, this audio signal may be output via an output device 160, such as a set of one or more loudspeakers. Understand while shown at this high level in the embodiment of FIG. 1, many variations and alternatives are possible.

Note that signal paths $105_0$, $105_1$ may be implemented on a single semiconductor die of a single integrated circuit (IC). In other cases, signal paths 105 may be implemented on separate die within one or more semiconductor packages. Still further, note that while signal paths $105_0$, $105_1$ are shown generally identical through delay estimation circuit 140, understand that the additional components described in receiver 100 may be present in one or both signals paths, with certain components not used in one or more the other of signal paths 105 depending upon implementation.

Also understand that while some embodiments may implement the various circuitry shown in FIG. 1 as discrete circuits, in other cases the digital circuitry (namely all circuitry after digitization in ADC circuit 125) may be implemented within a programmable execution circuit, such as one or more digital signal processors (DSPs).

Figure 2:
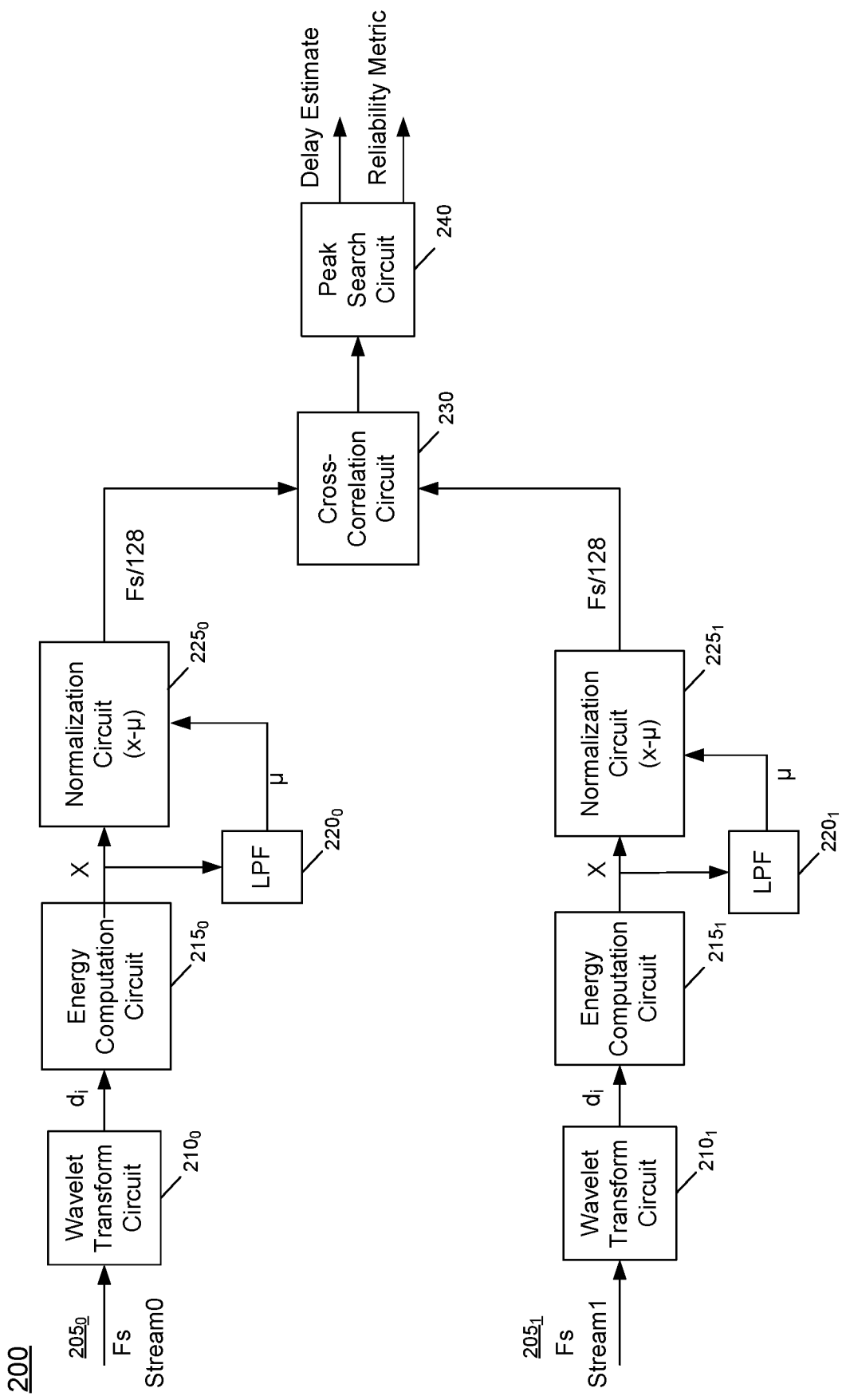
FIG. 2 is a block diagram of a delay estimation circuit in accordance with an embodiment.

As discussed above, processing circuitry may be used to perform synchronization between different audio streams. Referring now to FIG. 2, shown is a block diagram of a delay estimation circuit in accordance with an embodiment. While FIG. 2 shows a hardware circuit implementation in which various constituent sub-circuits or components are present, understand synchronization operations as described herein may be performed by hardware circuitry, software, firmware and/or combinations thereof in different implementations. As an example, in some cases synchronization may be performed by a general-purpose processor such as a DSP or other programmable processing circuit that executes instructions to perform the synchronization operations as described herein.

As illustrated in FIG. 2, synchronization circuit 200 includes parallel processing paths, namely a first processing path $205_0$ and a second processing path $205_1$. In general, processing paths 205 include circuitry to receive incoming data streams, e.g., output from a corresponding demodulator. The demodulator in turn receives modulated audio signals output from a tuner that receives incoming RF signals, processes and downconverts such signals to a baseband or other lower frequency signal.

For ease of discussion, components within first signal path $205_0$ are discussed. Understand that similar circuitry is present in second audio path $205_1$. As seen, an incoming audio stream (stream 0) is received in a wavelet transform circuit $210_0$ (also referred to herein as a wavelet transform engine). As will be described herein, wavelet transform circuit 210 may be used to generate signal information in a wavelet scale domain. Wavelet transform circuit 210 may output sub-sampled data corresponding to wavelet information of a selected frequency range. Wavelet transform circuit 210 is implemented with a Haar function in discrete time, in one embodiment. More specifically wavelet transform circuit 210 may be implemented using filter pairs such as quadrature match filters (QMF). Other filter pairs can be used, such as Daubechies function-based filters. In a particular implementation herein, the wavelet's detail coefficients $d_4$, which correspond to frequency range [750, 1500] Hz (when $F_S$=48 kHz), may be selected for further processing. In an embodiment, $d_4$ includes four values.

As illustrated, corresponding wavelet transform information (in the form of one or more filter coefficients, $d_i$) is provided to an energy computation circuit $215_0$, which computes an energy signature based on the sub-sampled information received from wavelet transform circuit 210. The energy, E(t), of these four values can be computed in different manners in different implementations.

The resulting energy signature is output from energy computation circuit 215 to a low pass filter (LPF) $220_0$ and a normalization circuit $225_0$. In turn, normalization circuit 225 may generate a normalized energy signature based upon the received energy signature and the filtered energy signature output from LPF 220. In this way, a DC offset may be removed from the power envelope of this energy signature. Over time, E(t) creates an energy signature of the [750, 1500] Hz frequency band. The mean value of this energy signature is thus removed before cross-correlation to remove DC offsets. In turn, the resulting normalized energy signature from normalization circuit 225 is provided to a cross-correlation circuit 230. Note that similar circuitry is present in second processing path $205_1$.

As described herein, cross-correlation circuit 230 correlates the energy signature against another energy signature input over a time window. In an embodiment cross-correlation circuit 230 may execute at $\frac{1}{128}$th the rate of the input stream sample rate to meet a specified ability to estimate a maximum delay, e.g., of 10 seconds. This operation may be especially suited to an implementation that executes on a DSP or other general-purpose processor, as such device can be memory and/or MIPS limited. Cross-correlation circuit 230, based upon normalized values received from paths 205 and buffered cross-correlation values for other time windows, may generate a given cross-correlation for the time window, which it provides to a peak search circuit 240 (and may accumulate in a cross-correlation buffer).

In turn, peak search circuit 240 may determine whether a valid correlation exists between the two data streams. If so, based upon the correlation information, peak search circuit 240 may determine a delay estimate between the two signal paths and also may generate one or more reliability metrics. Peak search circuit 240 determines various metrics including the maximum peak index, the peak-to-average ratio, and the peak-to-second peak ratio. These ratios are used to make a decision on a match and a confidence value, along with the time delay estimate. Understand while shown at this high level in the embodiment of FIG. 2, many variations and alternatives are possible. For example, while separate paths and components are shown for ease of illustration, it is possible for given processing circuitry to operate on the signals of both paths.

Figure 3:
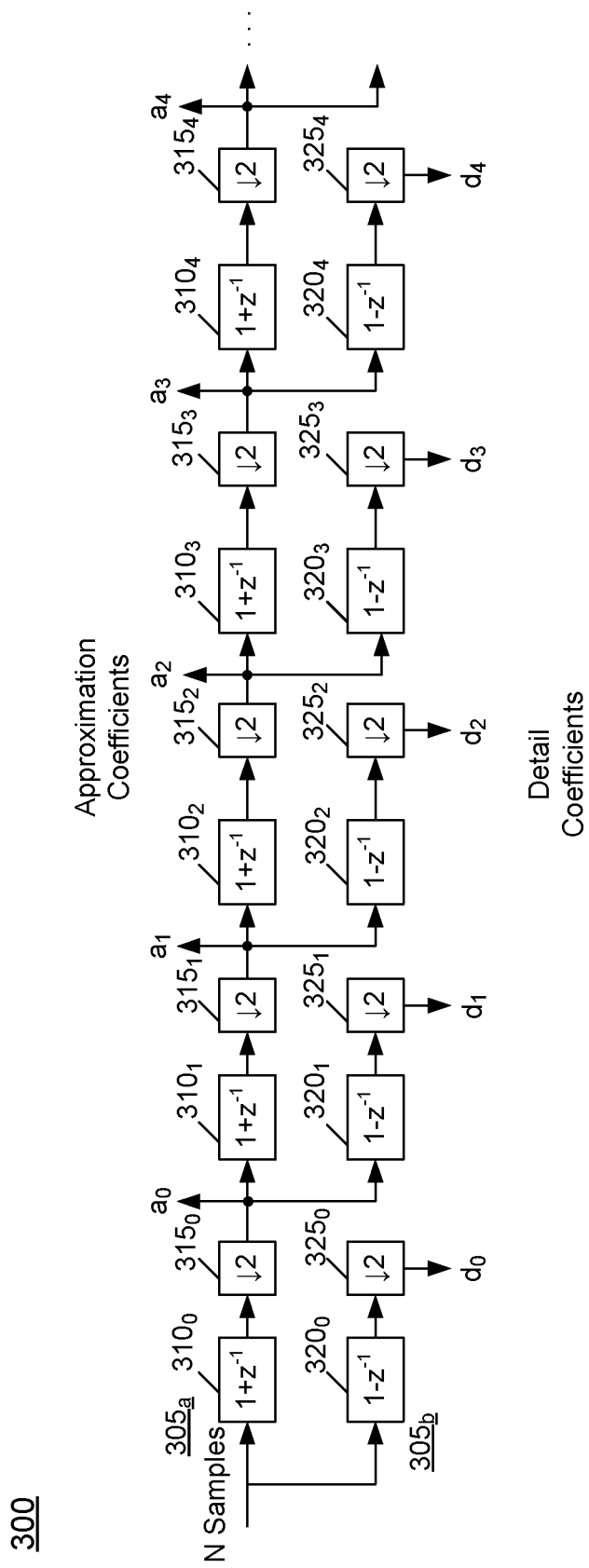
FIG. 3 is a block diagram of a wavelet transform engine in accordance with an embodiment.

Referring now to FIG. 3, shown is a block diagram of a wavelet transform engine in accordance with an embodiment. As shown in FIG. 3, engine 300, which in a representative embodiment is one of wavelet transform circuits 210 of FIG. 2, may be implemented as a quadrature match filter including multiple filter paths $305_a$ and $305_b$. As seen, each filter path 305 is configured to receive incoming samples (e.g., N samples), which are provided to both filter paths 305. First filter path $305_a$ includes a plurality of serially coupled delay elements $310_0$-$310_4$. As further seen, the output of each delay element 310 is coupled to an input of a corresponding downsampler $315_0$-$315_4$, each of which may be implemented as having a reduction factor of 2 to reduce sample rate. Note that delay elements 310 are implemented as additive delay elements (each implementing the function $1+Z^{-1}$). As further seen, the output of each downsampler corresponds to an approximation coefficient $a_0$-$a_4$.

These approximation coefficients are in turn fed to inputs of corresponding delay elements 320 of second filter path 305.

In turn second filter path 305$_b$ includes a plurality of serially coupled delay elements 320$_0$-320$_4$. As further seen, the output of each delay element 320 is coupled to an input of a corresponding downsampler 325$_0$-325$_4$, each of which may be implemented as having a reduction factor of 2 to reduce sample rate. Note that delay elements 320 are implemented as subtractive delay elements (each implementing the function $1-Z^{-1}$). As further seen, the output of each downsampler corresponds to a detail coefficient $d_0$-$d_4$. The detail coefficients represent the signal in the wavelet scale domain. One can perfectly reconstruct an input signal given all the detail coefficients and the single final approximation coefficient. The decomposition using the Haar wavelet is very efficient when calculating a single detail coefficient value. In the case of $d_4$, for an incoming sequence of 32 values $x_0 \ldots x_{31}$, $d_4$=sum $(x_0 \ldots x_{15})$–sum $(x_{16} \ldots x_{31})$.

With the implementation of FIG. 3, reduced compute complexity is realized, as reduced amounts of computations may be performed. Understand while FIG. 3 is shown with an implementation having only a limited number of delay elements and downsamplers (and particular structures for the delay elements and reduction factors), different numbers of delay elements and reduction factors are possible in other embodiments. Furthermore, while a single detail coefficient, namely $d_4$, is obtained for further use as described herein, in other implementations additional or different detail coefficients and/or approximation coefficients may be used to perform the further processing as described herein.

Figure 4:
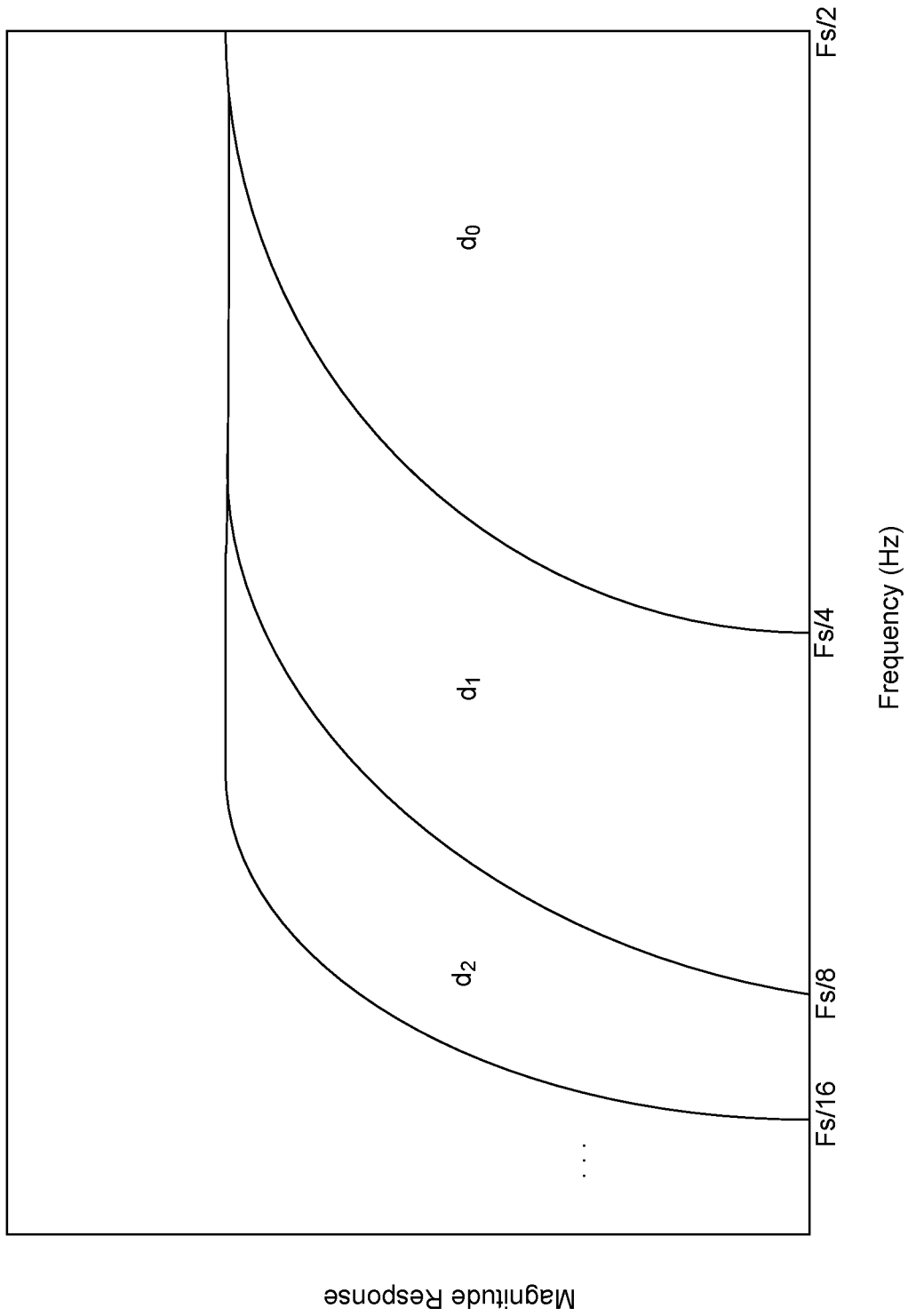
FIG. 4 is a graphical illustration of a magnitude response over frequency ranges in accordance with an embodiment.

FIG. 4 is a graphical illustration of a magnitude response over frequency ranges. As shown in FIG. 4, $d_0$ is a representation of frequencies in the range [Fs/4, Fs/2] by N/2 coefficients. In turn, $d_1$ is a representation of frequencies in the range [Fs/8, Fs/4] by N/4 coefficients . . . $d_k$ is a representation of frequencies in the range [Fs/$2^{k+1}$, Fs/$2^k$] by N/$2^{k+1}$ coefficients. The detail coefficients are the representation of the high frequency components in the chosen range. Take the first stage, for example, a0 and d0. All the higher frequency components have been taken out of a0 and are represented by d0. The original signal can be perfectly reconstructed given a0 and d0.

Figure 5:
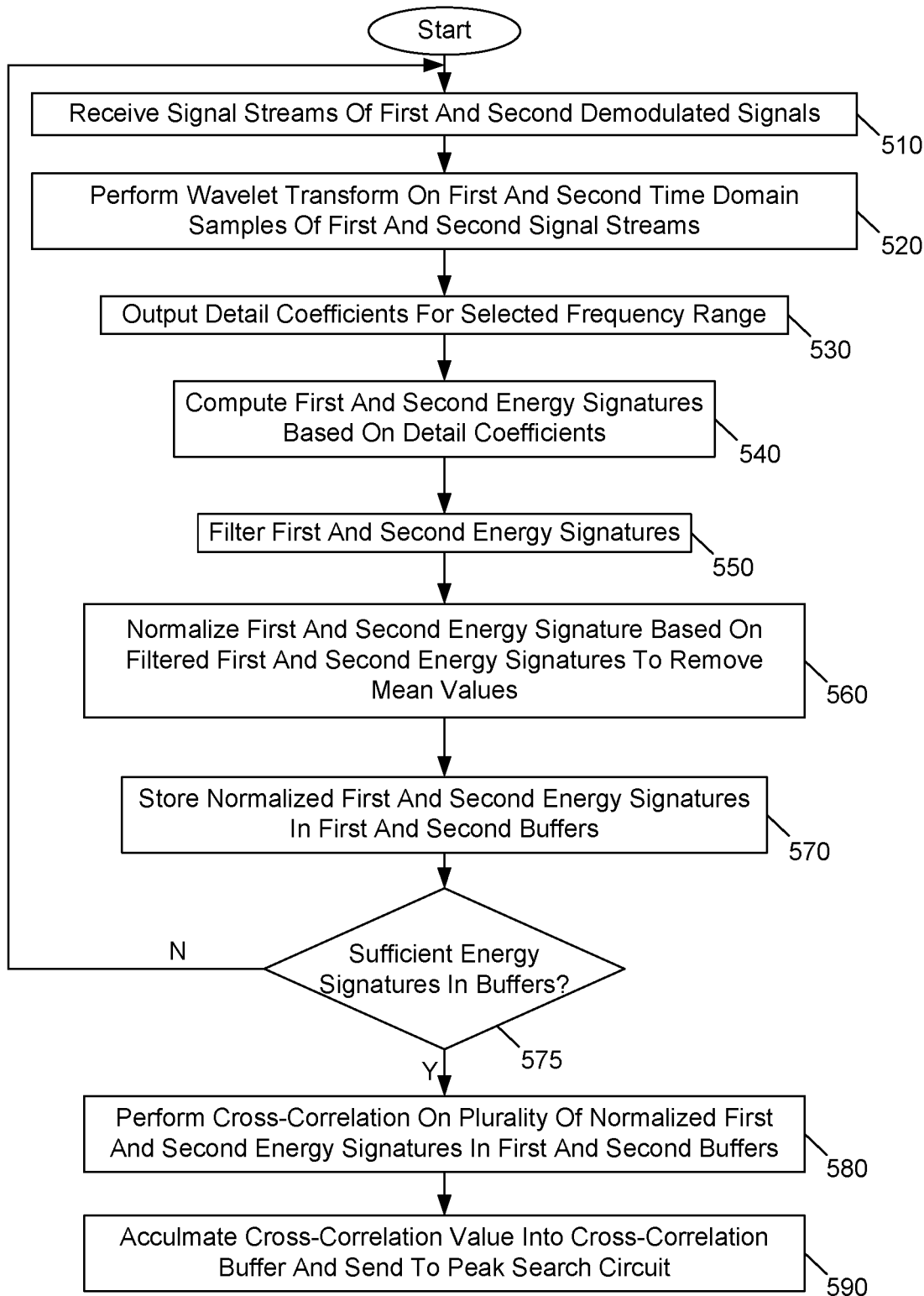
FIG. 5 is a flow diagram of a method in accordance with an embodiment.

Referring now to FIG. 5, shown is a flow diagram of a method in accordance with an embodiment. As shown in FIG. 5, method 500 is a method for processing incoming audio streams to synchronize common content within the audio streams. More specifically, FIG. 5 is a method for obtaining cross-correlation information that may further be used to determine a correlation between the audio streams. From this correlation information, a delay estimate representing a delay between the two audio streams can be determined. In embodiments, method 500 may be performed by hardware circuitry, software, firmware, and/or combinations. In a particular embodiment, method 500 may be performed at least in part in a DSP coupled to receive incoming audio streams from one or more demodulators.

As illustrated, method 500 begins by receiving signal streams of first and second demodulated signals (block 510). As described herein, these demodulated signals may be from digital or analog-based sources and may be according to the same or different modulation schemes. Next at block 520 a wavelet transform may be performed on given time domain samples of these two streams. For example, assume an incoming sample rate of $F_S$, the wavelet transform process may be performed on $F_S$/M samples where M may be, e.g., 8. In this way, faster and more efficient computations can be performed while providing sufficiently accurate estimations.

In one embodiment, a quadrature match filter arrangement as described above in FIG. 3 may be used to perform the wavelet transform. Next at block 530, detail coefficients of a selected frequency range may be output for these time domain samples. For example, a given detail coefficient corresponding to $F_S$/4, $F_S$/8 may be used to represent a frequency range higher than a range around DC. In a particular embodiment, this frequency range may be between approximately 750-1500 Hz.

Still with reference to FIG. 5, energy signatures may be computed from these detail coefficients (block 540). In one embodiment, a sum of squares technique may be used to calculate an energy signature from the, e.g., four values of each of the selected detail coefficients. Next, at block 550 the corresponding energy signatures may be filtered, e.g., in an LPF. Control next passes to block 560, where a normalization process may be performed. In one embodiment this normalization process may remove DC offset information, e.g., by removing mean values from the energy signature, such that resulting normalized energy signatures are generated. These normalized energy signatures may be stored in corresponding first and second buffers (block 570). In different embodiments, these buffers may be internal to the DSP or other processor or may be maintained in a memory coupled thereto.

Still with reference to FIG. 5, next it is determined whether there are sufficient samples of energy signatures stored in the buffers (diamond 575). If so, control passes to block 580 where a cross-correlation may be performed on the buffered energy signatures. Finally, this determined cross-correlation may be accumulated in a cross-correlation buffer (block 590). In addition the cross-correlation may further be sent to a peak search circuit, where it may be used to determine metrics and so forth as discussed further below. Understand while shown at this high level in the embodiment of FIG. 5, many variations and alternatives are possible.

Figure 6:
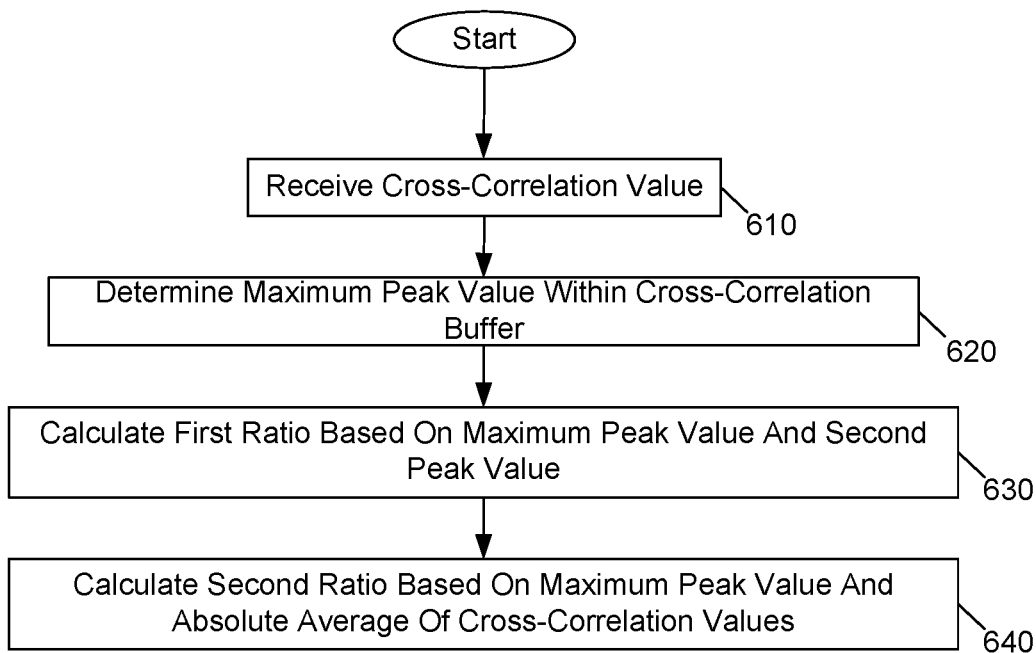
FIG. 6 is a flow diagram of a method in accordance with another embodiment.

Referring now to FIG. 6, shown is a flow diagram of a method in accordance with another embodiment. As illustrated, method 600 is a method for determining metric values based on correlations as described herein. As such, method 600 may be performed by hardware circuitry, software, firmware, and/or combinations. In a particular embodiment, method 600 may be performed at least in part in a peak search circuit that receives the result of cross-correlations performed in a cross-correlator.

Method 600 begins by receiving a cross-correlation value in the peak search circuit (block 610). Next, a maximum peak value within the cross-correlation buffer can be determined (block 620). Control next passes to block 630 where a first ratio may be calculated. This first ratio corresponds to a peak-to-second peak ratio and may be determined using the value of the detected peak and a second highest peak value of the stored correlation values. Next, at block 640, a second ratio may be calculated. This second ratio corresponds to a peak-to-average peak ratio and may be determined using the value of the detected peak and an absolute average value of the stored correlation values.

Figure 7:
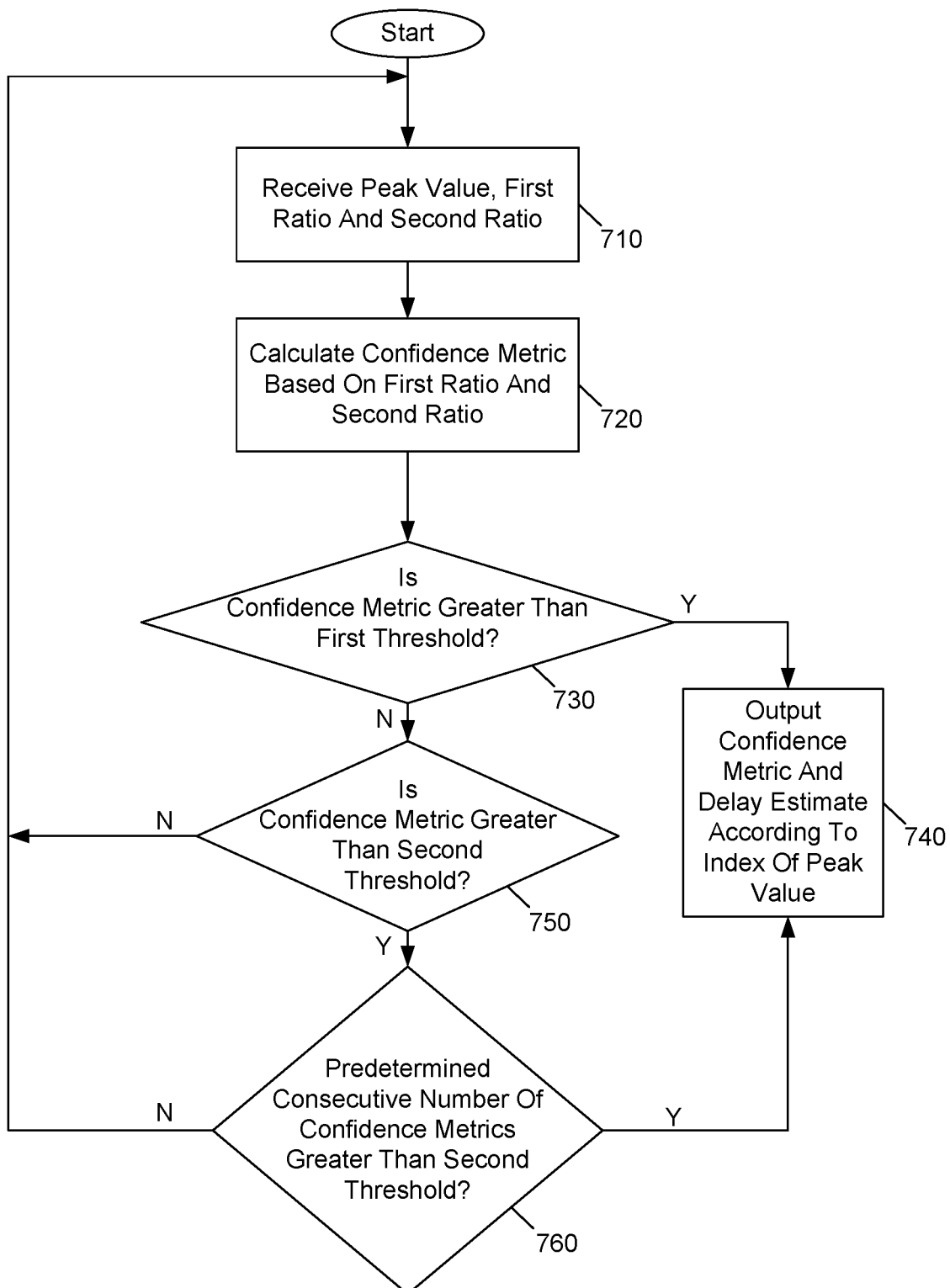
FIG. 7 is a flow diagram of a method in accordance with yet another embodiment.

Referring now to FIG. 7, shown is a flow diagram of a method in accordance with yet another embodiment. More specifically, method 700 of FIG. 7 is a method for determining whether a correlation exists between two audio streams, and if so, determining a measure of a delay estimate between the two audio streams, as well as setting a confidence metric. As such, method 700 may be performed by hardware circuitry, software, firmware, and/or combinations. In a particular embodiment, method 700 may be performed at least in part in the peak search circuit based at least in part on correlation and metric information.

As illustrated, method 700 begins by receiving the peak value and first and second ratios (block 710). Next, at block 720 a confidence metric may be calculated based on the two ratios. In one embodiment, the calculation may be according to a multiplication operation between the two ratios to generate a product. In turn, a logarithmic value of that product may be calculated that corresponds to the confidence metric. As such, when both ratios are relatively high, the product similarly may be relatively high and accordingly the resulting log value also may be relatively high, e.g., at least 0.

Still with reference to FIG. 7, next at diamond 730 it is determined whether the confidence metric is greater than a first threshold. This first threshold, in an embodiment, may be set at a relatively high value, e.g., greater than approximately 50%. If it is determined that the confidence metric exceeds this first (relatively high) threshold, it is ensured that a good peak has been found that is substantially higher than the second peak value and further is substantially higher than an absolute average value of the stored correlation values. As such, a correlation is identified.

In this instance, a delay estimate can be determined according to an index of the peak value, which may be used to establish the delay between the two audio streams. Still further, this delay estimate and the confidence metric may be output (block 740). In embodiments, the delay estimate and the confidence metric may be sent to an audio processor such as a linker circuit, which may be seeking to perform a blend or fade operation between the two audio streams and may use these values to thus synchronize audio samples of the two streams and blend them based at least in part on the confidence metric. In other cases, this information may be provided to higher level software such as a radio application, which may use the information to make a more complex decision. For example, if the delay is large, the software might decide to blend only if the confidence is extremely high.

Still referring to FIG. 7, as further illustrated, if it is determined that the confidence metric does not exceed this first threshold, control passes to diamond 750 where it is determined whether the confidence metric is greater than a second, lower threshold. Although embodiments are not limited in this regard, as an example the second threshold may be set at a lower level, e.g., approximately 25%. If the confidence value does not exceed this lower threshold, it is an indication that the audio streams are not well correlated such that a desirably high peak value has not been found. As such, control passes back to block 710 discussed above, where method 700 may be further performed in light of additional samples received and processed.

Finally, if the confidence metric exceeds this second threshold it can next be determined at diamond 760 whether a predetermined consecutive number of confidence metrics exceeds this second threshold. As one example, this predetermined number may be set at, e.g., 3. As such, if during three consecutive iterations of method 700 it is determined that the confidence metric exceeds this second threshold (but does not exceed the first threshold), a reasonable level of confidence is identified and accordingly, control passes to block 740 for determination and output of the corresponding delay estimate and the confidence metric. Understand while shown at this high level in FIG. 7, understand that many variations and alternatives are possible.

Figure 8:
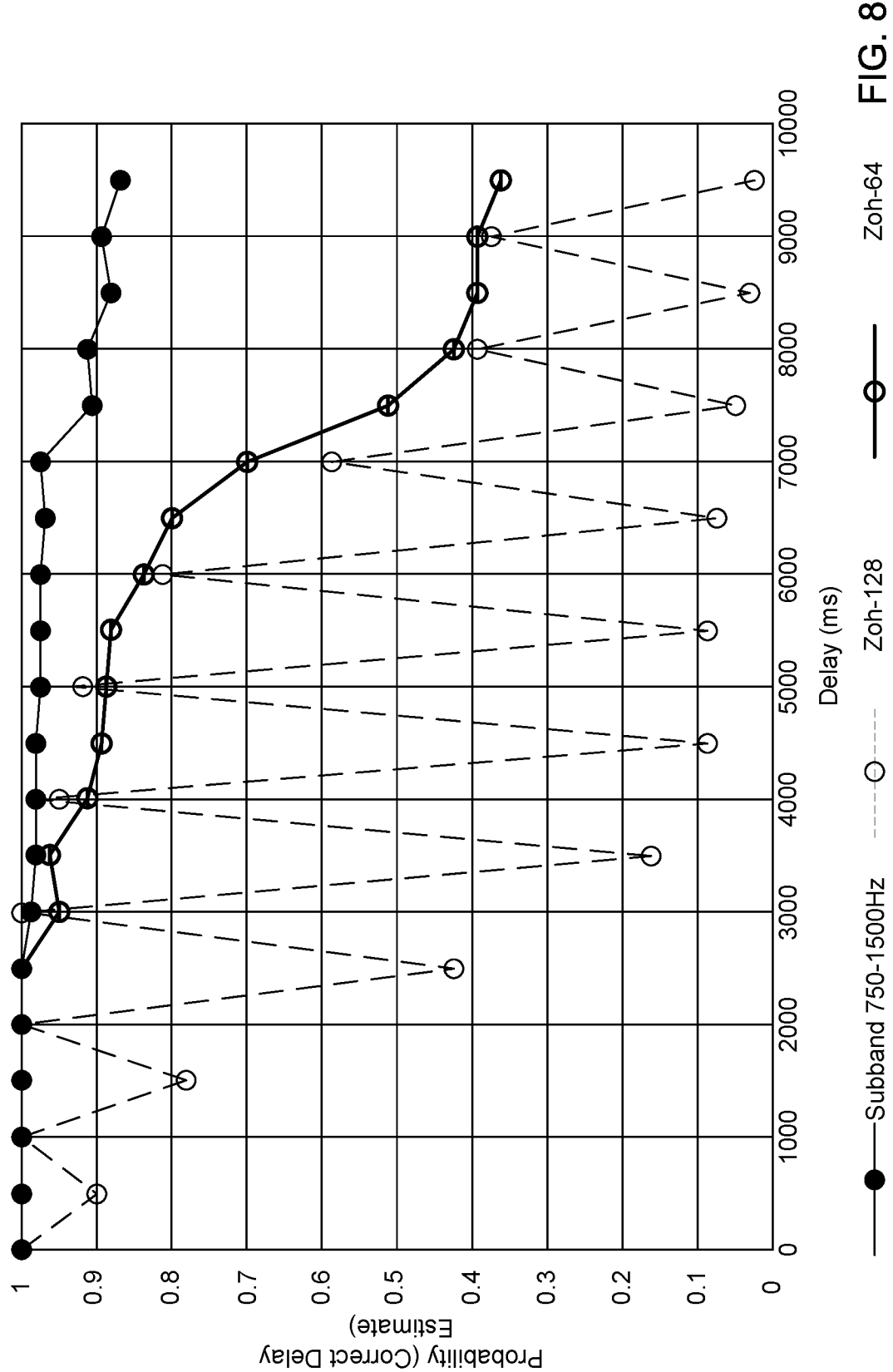
FIG. 8 is a comparison of reliability of delay estimations according to different techniques.

Referring now to FIG. 8, shown is a comparison of probabilities of correct delay estimate determinations using an embodiment (namely shown with solid dots) for analysis in a 750-1500 Hz band. As seen, these results are substantially steady at a high level of probability of correct delay estimations across a wide range of delays. In contrast, with other techniques that operate using a Fourier analysis, less accurate delay estimates occur, particularly at higher delays.

Many different implementations of radio receivers including synchronization circuitry as described herein are possible. In turn, such receivers can be implemented into a wide variety of end user systems. For purposes of additional discussion herein, FIG. 9 shows an embodiment in which a synchronization circuit to identify a correlation between two audio streams, determine a delay estimate and corresponding reliability metrics, is used in the context of a vehicle entertainment system.

Figure 9:
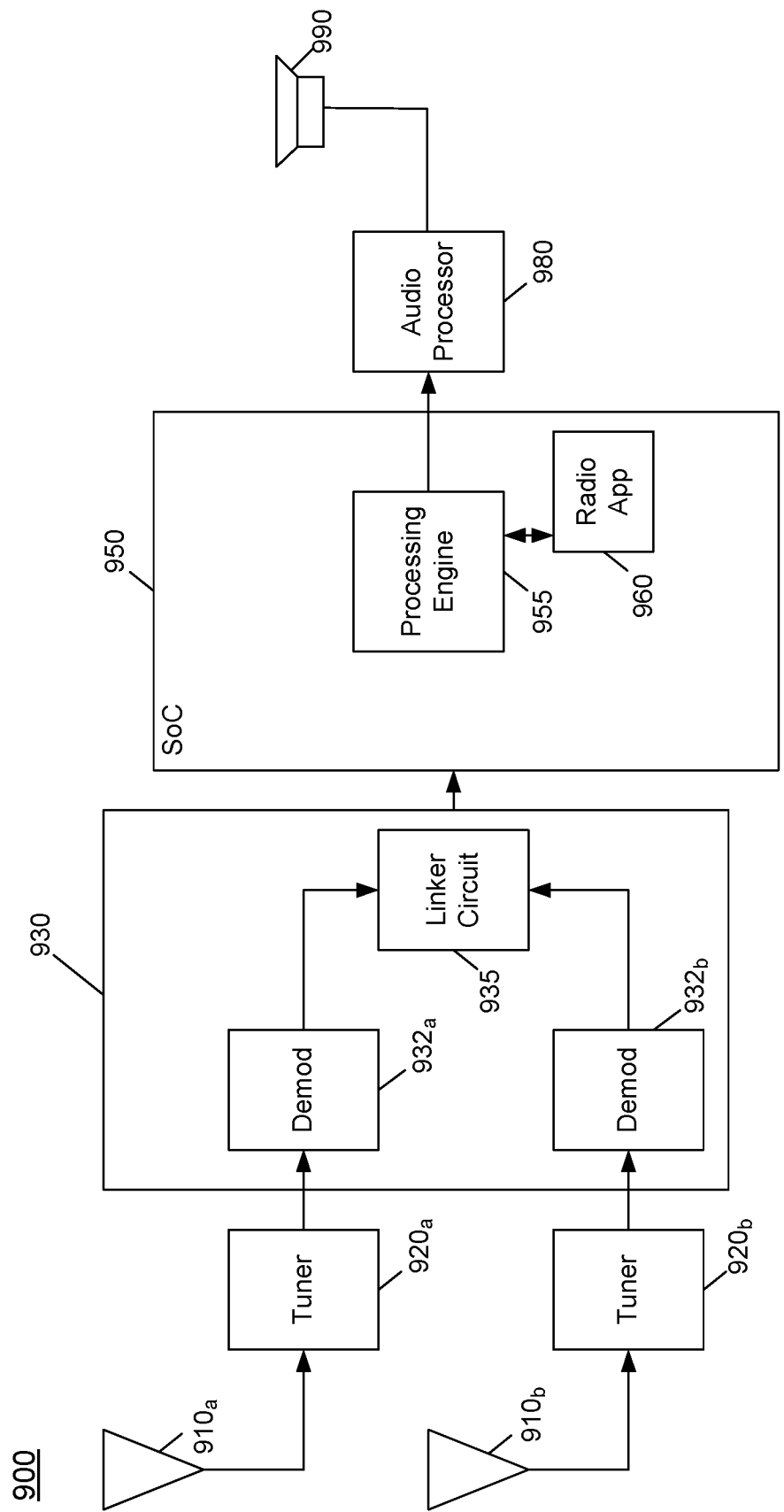
FIG. 9 is a block diagram of a system in accordance with an embodiment.

Referring now to FIG. 9, shown is a block diagram of a system in accordance with an embodiment. As shown in FIG. 9, system 900 is at least a portion of a vehicle infotainment system. As illustrated, system 900 includes various components adapted on a circuit board, as well as additional components that may be located in other portions of a vehicle.

In the embodiment shown in FIG. 9, incoming radio frequency (RF) signals are received by multiple antennas $910_a$, $910_b$ (generically antennas 910). Understand while two antennas are shown for purposes of discussion, in different implementations a vehicle may be adapted with only a single antenna or more than two antennas, as appropriate for a given tier of radio solution, as well as desired bands of service. For purposes of discussion herein, assume that antennas 910 are configured to receive digital radio communications in accordance with one or more digital radio standards such as DAB, HD radio, digital radio mondiale (DRM) or so forth, analog radio stations (e.g., AM and FM) and potentially other broadcast signaling, including video signaling, e.g., according to a digital media broadcast (DMB) standard.

Received RF signals from antennas 910 are in turn provided to corresponding tuners $920_a$, $920_b$ (generically tuner 920). In various embodiments, tuners 920 may be implemented in one or more integrated circuits. Tuners 920 may be multi-band tuners to receive and process RF signals of different bands. In general, tuners 920 may include RF front end circuitry such as a LNA and other gain control circuitry, mixer, filter, digitizer and so forth that operate to receive and process the RF signal and generate a resulting digitized signal at a downconverted frequency. For example, tuners 920 may be configured to output signals at baseband, zero intermediate frequency (ZIF) or other downconverted level. In embodiments, tuners 920 may output such signals in digitized form.

As further illustrated in FIG. 9, resulting digitized signals are provided to a demodulator 930. In embodiments, demodulator 930 may be implemented as a standalone IC. In other cases, it may be possible for a single integrated circuit (e.g., including one or more semiconductor die) to incorporate both tuners 920 and demodulator 930. As illustrated in FIG. 9, demodulator 930 includes multiple demodulation circuits $932_a$, $932_b$ (generically demodulator circuit 932), each to receive incoming signal information from one of tuners $920_a$, $920_b$. In turn, demodulator circuits 932 operate to demodulate the incoming signals, which are received in a modulated form. In general, demodulator circuits 932 may include various circuitry including asynchronous sample rate converters, decoder circuitry and so forth. As such, demodulator circuits 932 output demodulated signals, which are provided to a linker circuit 935.

In embodiments, linker circuit 935 may seamlessly link demodulated signals of the two paths when appropriate. As such, linker circuit 935 may seamlessly transition its output to be directed from a given one of demodulator circuits 932 to the other in a seamless fashion (e.g., by providing buffering resources or so forth) such that the transition from one frequency to another occurs seamlessly to a listener. Linker circuit 935 may include synchronization circuitry as described herein to perform the various techniques leveraging wavelet coefficients to efficiently identify correlations between audio streams with reduced compute and storage resources.

Still with reference to FIG. 9, demodulated signals output from demodulator 930 are provided to a system on chip (SoC) 950, which is a main processor of infotainment system 900. As illustrated in FIG. 9, SoC 950 includes a processing engine 955. Although a single processing engine is shown for ease of illustration, understand that in various implementations, multiple processing engines may be provided. As examples, processing engine 955 may be implemented as one or more general-purpose processor cores, one or more DSPs, and/or one or more other programmable logic circuits.

SoC 950 is additionally shown to include a radio application 960, which in an embodiment may be a high level radio application of the system and which may execute on processing engine 955. Radio application 960 may act as an interface to receive user input (e.g., a request for a given radio station) and provide instructions to additional components to effect the requested functionality.

Note that while radio application 960 is illustrated as a separate component within SoC 950, understand that it may be implemented as software and/or firmware that executes on processing engine 955 or other programmable circuitry within SoC 950. As such, whether implemented as software or firmware, instructions are stored in a non-transitory storage medium. Such storage medium may be implemented within SoC 950 itself such as an internal non-volatile memory or an external memory such as an external flash memory of system 900.

Understand further that while a particular delineation of components is shown in FIG. 9, other implementations are possible. For example, in some cases it may be possible for demodulation operations and linking functionality (including the synchronization of audio streams as described herein) to be performed within SoC 950 on processing engine 955 and/or other hardware circuitry of SoC 950. In such cases, the non-transitory storage medium may further include instructions that when executed perform the synchronization operations described herein.

As further shown in FIG. 9, processing engine 955 outputs audio signals which may be provided to an optional audio processor 980. Audio processor 980 may perform additional audio processing such as post-processing, balance control, fading, and so forth. In turn, audio processor 980 outputs audio signals to one or more speakers 990. Understand while shown at this high level in the embodiment of FIG. 9, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a receiver to receive and process a first radio frequency (RF) signal and a second RF signal to obtain a first signal stream and a second signal stream;
 a first wavelet transform engine to receive the first signal stream and perform a wavelet transform on a first time domain sample of the first signal stream, the first wavelet transform engine to output at least one first coefficient for a first frequency range;
 a first energy calculation circuit to compute a first energy signature for the at least one first coefficient;
 a first filter to filter the first energy signature;
 a first normalization circuit to generate a first normalized value based on the first energy signature and the filtered first energy signature;
 a correlation circuit to generate a correlation value using the first normalized value, a second normalized value and a plurality of previous first normalized values and second normalized values; and
 a peak search circuit coupled to the correlation circuit to generate a reliability metric based at least in part on information from the correlation circuit, the peak search circuit to provide the reliability metric to an audio processor, wherein the audio processor is to seamlessly link the first signal stream and the second signal stream based at least in part on the reliability metric.

2. The apparatus of claim 1, wherein the correlation circuit is to store the correlation value in a correlation storage.

3. The apparatus of claim 2, wherein the peak search circuit is to identify a peak value of a plurality of correlation values stored in the correlation storage.

4. The apparatus of claim 3, wherein the peak search circuit is to identify a second peak value of the plurality of correlation values stored in the correlation storage, the second peak value less than the first peak value.

5. The apparatus of claim 4, wherein the peak search circuit is to calculate a first ratio based on the peak value and the second peak value.

6. The apparatus of claim 5, wherein the peak search circuit is to calculate a second ratio based on the peak value and an average of the plurality of correlation values in the correlation storage.

7. The apparatus of claim 6, wherein the peak search circuit is to generate the reliability metric based on the first ratio and the second ratio.

8. The apparatus of claim 7, wherein the peak search circuit is to identify a correlation between the first signal stream and the second signal stream in response to the reliability metric being greater than a first threshold.

9. The apparatus of claim 8, wherein the peak search circuit is to identify the correlation in response to the reliability metric being less than the first threshold and greater than a second threshold for at least a first plurality of consecutive windows.

10. The apparatus of claim 1, wherein the wavelet transform engine comprises:
 a first filter chain including a first plurality of delay elements and a first plurality of downsamplers, the first filter chain to generate a plurality of first coefficients, the plurality of first coefficients including the at least one first coefficient; and
 a second filter chain including a second plurality of delay elements and a second plurality of downsamplers, the second filter chain to generate a plurality of second coefficients, the plurality of second coefficients including the at least one second coefficient.

11. At least one non-transitory computer readable medium including instructions that when executed cause a system to perform a method comprising:
receiving and processing, in a receiver, a first radio frequency (RF) signal and a second RF signal;
demodulating, in a first demodulator, the first processed signal to generate a first demodulated signal;
demodulating, in a second demodulator, the second processed signal to generate a second demodulated signal;
receiving, in a processor, the first demodulated signal and the second demodulated signal;
performing, in the processor, a wavelet transform on first time domain samples of the first demodulated signal and second time domain samples of the second demodulated signal;
outputting a first detail coefficient for a selected frequency range based on the wavelet transform of the first time domain samples and outputting a second detail coefficient for the selected frequency range based on the wavelet transform of the second time domain samples;
computing a first energy signature based on the first detail coefficient and computing a second energy signature based on the second detail coefficient;
performing a cross-correlation on a plurality of first energy signatures and a plurality of second energy signatures stored in at least one buffer to identify common content in the first demodulated signal and the second demodulated signal, the first energy signature one of the first plurality of first energy signatures and the second energy signature one of the plurality of second energy signatures; and
communicating information regarding the common content to an audio processor to enable the audio processor to perform a blend or handover with a first audio signal obtained from the first demodulated signal and a second audio signal obtained from the second demodulated signal.

12. The at least one non-transitory computer readable medium of claim 11, further comprising instructions that when executed cause the system to perform the method further comprising:
filtering the first energy signature into a filtered first energy signature and normalizing the first energy signature based on the filtered first energy signature;
filtering the second energy signature into a filtered second energy signature and normalizing the second energy signature based on the filtered second energy signature; and
storing the normalized first energy signature and storing the normalized second energy signature in the at least one buffer.

13. The at least one non-transitory computer readable medium of claim 11, further comprising instructions that when executed cause the system to perform the method further comprising:
determining whether there are a sufficient number of first energy signatures and second energy signatures stored in the at least one buffer; and
in response to the determination, performing the cross-correlation on the plurality of first energy signatures and the plurality of second energy signatures.

14. The at least one non-transitory computer readable medium of claim 11, further comprising instructions that when executed cause the system to perform the method further comprising:

identifying a peak value based on the cross-correlation;
identifying a second peak value based on the cross-correlation, wherein the second peak value is less than the peak value; and
calculating an average cross-correlation value based on a plurality of cross-correlation values.

15. The at least one non-transitory computer readable medium of claim 14, further comprising instructions that when executed cause the system to perform the method further comprising:
determining a first ratio based on the peak value and the second peak value; and
determining a second ratio based on the peak value and the average cross-correlation value.

16. The at least one non-transitory computer readable medium of claim 15, wherein the method further comprises determining a reliability metric using the first ratio and the second ratio.

17. The at least one non-transitory computer readable medium of claim 16, wherein the method further comprises:
outputting a delay estimate based on the peak value and outputting the reliability metric when the reliability metric exceeds a first threshold.

18. The at least one non-transitory computer readable medium of claim 17, wherein the method further comprises outputting the reliability metric when the reliability metric exceeds a second threshold less than the first threshold for at least a predetermined plurality of consecutive windows.

19. A system comprising:
a first antenna to receive a first radio frequency (RF) signal;
a second antenna to receive a second RF signal;
a first tuner coupled to the first antenna to receive and process the first RF signal to output a first downconverted modulated signal;
a second tuner coupled to the second antenna to receive and process the second RF signal to output a second downconverted modulated signal;
a first demodulator coupled to the first tuner to demodulate the first downconverted modulated signal to output a first signal stream;
a second demodulator coupled to the second tuner to demodulate the second downconverted modulated signal to output a second signal stream; and
a linker circuit to seamlessly link the first signal stream and the second signal stream to output a seamlessly linked signal stream to a processor, the linker circuit comprising:
a wavelet transform engine to receive the first and second signal streams, perform a wavelet transform on a first time domain sample of the first signal stream and a second time domain sample of the second signal stream, and output at least one first coefficient and at least one second coefficient for a first frequency range;
an energy calculation circuit to compute a first energy signature for the at least one first coefficient and a second energy signature for the at least one second coefficient; and
a correlation circuit to generate a correlation value using the first energy signature, the second energy signature, and a plurality of stored first and second energy signatures.

20. The system of claim 19, wherein the linker circuit is to:
- identify a peak value of a plurality of correlation values;
- identify a second peak value of the plurality of correlation values;
- determine a first ratio based on the peak value and the second peak value;
- determine a second ratio based on the peak value and an average correlation value;
- determine a delay estimate based at least in part on the peak value;
- determine at least one reliability metric based on the first and second ratios; and
- seamlessly link the first signal stream and the second signal stream based at least in part on the delay estimate and the at least one reliability metric.

* * * * *